(12) United States Patent
Young

(10) Patent No.: US 9,183,287 B2
(45) Date of Patent: *Nov. 10, 2015

(54) SOCIAL MEDIA ANALYSIS SYSTEM

(75) Inventor: Malcolm P. Young, Oxfordshire (GB)

(73) Assignee: E-Therapeutics PLC, Oxfordshire (GB)

(*) Notice: Subject to any disclaimer, the term of this patent is extended or adjusted under 35 U.S.C. 154(b) by 708 days.

This patent is subject to a terminal disclaimer.

(21) Appl. No.: 13/553,857

(22) Filed: Jul. 20, 2012

(65) Prior Publication Data

US 2012/0284340 A1 Nov. 8, 2012

Related U.S. Application Data

(63) Continuation-in-part of application No. 13/015,832, filed on Jan. 28, 2011, now Pat. No. 8,862,586.

(30) Foreign Application Priority Data

Jan. 29, 2010 (EP) ..................................... 10152093

(51) Int. Cl.
*G06F 17/30* (2006.01)
*G06Q 50/00* (2012.01)
*G06Q 30/02* (2012.01)

(52) U.S. Cl.
CPC ...... *G06F 17/3071* (2013.01); *G06F 17/30864* (2013.01); *G06Q 30/02* (2013.01); *G06Q 50/01* (2013.01)

(58) Field of Classification Search
CPC ................................................ G06F 17/30864
USPC .................................................. 707/798, 739
See application file for complete search history.

(56) References Cited

U.S. PATENT DOCUMENTS

| 2007/0143322 A1 | 6/2007 | Kothari et al. |
| 2007/0239792 A1 | 10/2007 | Chen et al. |
| 2008/0244375 A1 | 10/2008 | Gentile et al. |
| 2009/0192954 A1 | 7/2009 | Katukuri et al. |
| 2011/0169833 A1* | 7/2011 | Basak ........................... 345/440 |

OTHER PUBLICATIONS

EP Search Report for related application EP 10152093, dated Jun. 21, 2010, 7 pgs.
Tebbutt, "User evaluation of automatically generated semantic hypertext links in a heavily used procedural manual", Information Processing and Management, No. 35, 1999, 1-18.
Agosti, et al. "Design and implementation of a tool for the automatic construction of hypertexts for information retrieval", Information Processing and Management, vol. 32, No. 4, 1996, pp. 459-476.

(Continued)

*Primary Examiner* — Alexey Shmatov
(74) *Attorney, Agent, or Firm* — Brooks, Cameron & Huebsch, PLLC

(57) ABSTRACT

An information processing apparatus (5) is provided including: a lexicon generation module (22) operable to identify strings of characters present in a set of social media posts (50); a network data generation module (24) operable to generate network data in which posts are associated with nodes and link data (53) link nodes corresponding to posts which contain similar sets of strings of characters; and a network analysis module (26) operable to process network data generated by the network data generation module (24) to determine one or more metric values for each of the nodes wherein the metric values are determined based on the patterns of connectivity defined by the link data (53). The generated metric values are then utilized to select one or more posts (55) as posts representative of the set of media posts.

16 Claims, 5 Drawing Sheets

(56) References Cited

OTHER PUBLICATIONS

Zhuge, et al., "Automatically discovering semantic links among documents", Fourth International Conference on Semantics, Knowledge and Grid, IEEE, Piscataway, NJ, Dec. 3, 2008, pp. 149-156.

Dhyani, et al., "A survey of web metrics", ACM Computing Surveys, vol. 34, No. 4, Dec. 2002, pp. 469-503.

Botafogo, et al. "Structural Analysis of Hypertexts: Identifying Hierarchies and Useful Metrics", ACM Transactions on Information Systems, vol. 10, No. 2, Apr. 1992, 142-180.

\* cited by examiner

SOCIAL MEDIA ANALYSIS SYSTEM

CROSS REFERENCE TO RELATED APPLICATIONS

This application is a continuation in part of U.S. application Ser. No. 13/015,832, filed Jan. 28, 2011, the specification of which is incorporated herein by reference.

FIELD OF THE INVENTION

The present application concerns a social media analysis system. In particular the present application concerns a social media analysis system for analyzing social media posts such as Twitter® "tweets" and Facebook® posts.

BACKGROUND

Social networking and micro-blogging services such as Twitter® and Facebook® provide new avenues for social comment. Such services typically allow users to post comments in a public or semi public forum and for those comments to be forwarded or shared with other groups of users. Such user comment is invaluable for marketers seeking to promote a particular product or lobbyists trying to promote a particular viewpoint as it provides rapid feedback as to how a product is perceived or an indication of popular opinion on a particular matter.

The nature and volume of social media posts, however, makes analysis of such posted information very difficult. Very large numbers of posts are generated and posts are generated by users in an unstructured manner. It is therefore difficult to know other than by reading each individual post what any particular post concerns and how they relate to other posts made by the same or other users. For large numbers of posts such an approach is impractical.

In view of this rather than providing analysis of the content of posts themselves most social media analysis has involved analysis of the links between users.

Thus for example, in the case of Twitter® certain relationships between users can be identified as users can choose to "follow", that is receive the posts of certain other identified users. The numbers of followers a particular user has is indicative of the extent to which messages posted by that user are likely to spread across the network. Similarly the numbers and identities of users someone chooses to follow can provide an indication of a user's interests, likes and sources of information.

Such analysis does provide some information about how data is spread via social media. However the analysis of links between users provides little if any information about the content of posts which are being shared by those users. Such information would be desirable because if it is possible to determine the types of messages influential users receive and broadcast, marketers could use that information to tailor their messages so that they were more likely to reach particular market segments.

SUMMARY OF THE INVENTION

In accordance with one aspect of the present application there is provided a method of analyzing social media posts, the method comprising: processing a set of social media posts to identify strings of characters present in the posts; generating network data by: associating posts with node numbers; and generating link data identifying links between nodes associated with posts containing similar sets of strings of characters; processing the generated network data to determine one or more metric values for each of the nodes wherein the metric values are determined based on the patterns of connectivity defined by the link data of the generated network data; utilizing the determined metric values for nodes to select one or more posts as posts representative of the set of media posts; and outputting data identifying the selected representative posts.

In accordance with another aspect of the present invention there is provided an information processing apparatus comprising: a lexicon generation module operable to identify strings of characters present in a set of social media posts; a network data generation module operable to generate network data in which posts are associated with nodes and link data link nodes corresponding to posts which contain similar sets of strings of characters; and a network analysis module operable to process network data generated by the network data generation module to determine one or more metric values for each of the nodes wherein the metric values are determined based on the patterns of connectivity defined by the link data of the generated network data; utilize the determined metric values for nodes to select one or more posts as posts representative of the set of media posts; and output data identifying the selected representative posts.

In another aspect of the present invention there is provided a computer readable medium storing interpretable instructions which when interpreted by a programmable computer cause the computer to perform a method as described above.

BRIEF DESCRIPTION OF THE DRAWINGS

Further aspects and embodiments of the present application will become apparent with reference to the following description and accompanying drawings in which.

DETAILED DESCRIPTION

Figure 1:
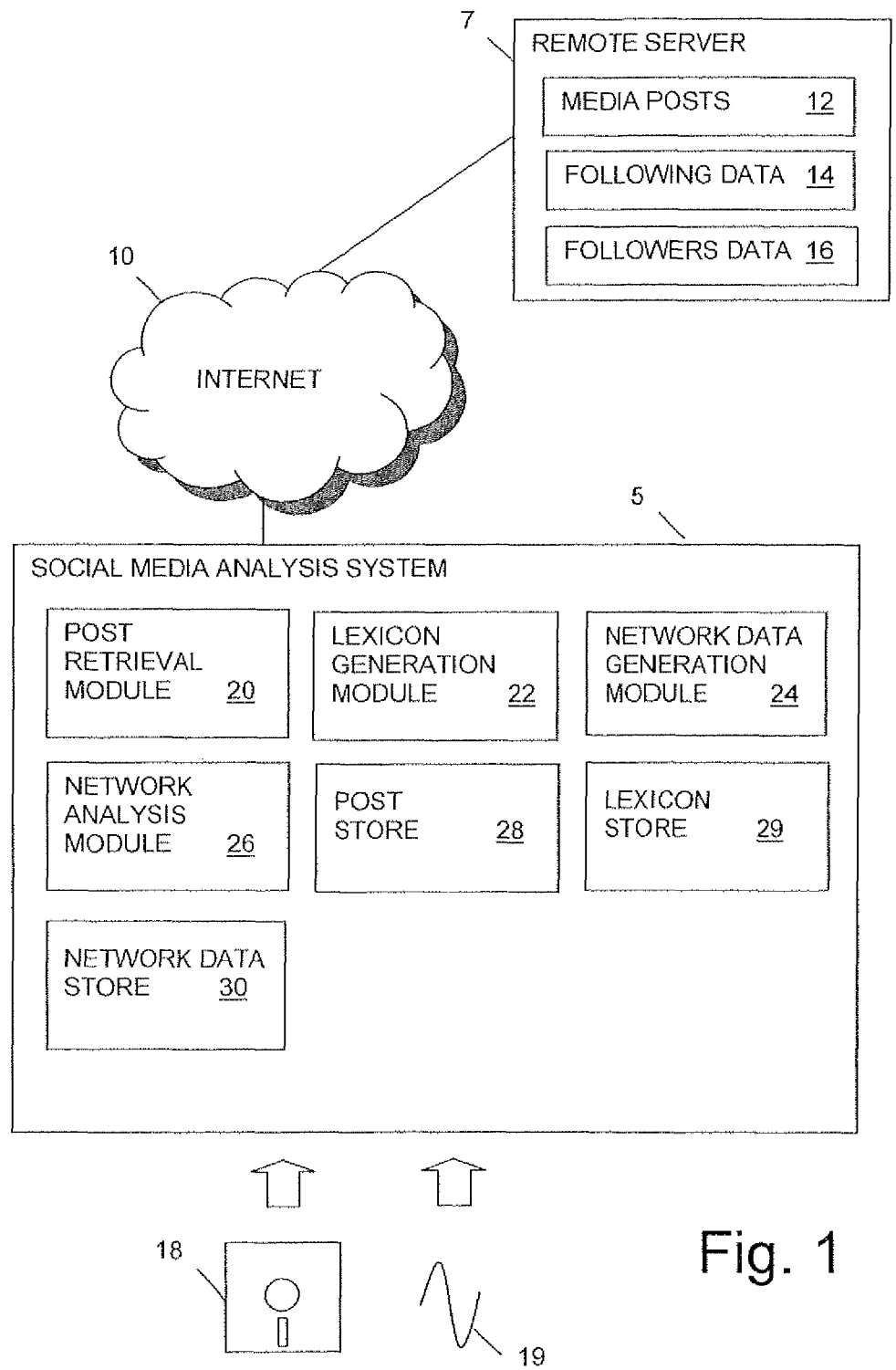
FIG. 1 is a schematic block diagram of a social media analysis system in accordance with an embodiment of the present invention.

Referring to FIG. 1, a social media analysis system 5 in accordance with an embodiment of the present invention comprises a programmable computer which is connected to a remote server 7 via the internet 10. Stored in the memory of the remote server 7 are a set of social media posts 12 which the social media analysis system 5 is arranged to analyze. Also stored on the remote server 7 is following data 14 associating users with lists of other users whose posts they would like to receive and followers' data 16 identifying the users who have indicated they would like to receive that user's posts.

In this embodiment, the social media analysis system 5 is configured by software provided on a disk 18 or by receiving an electrical signal 19 via a communications network to be configured into a number of functional modules 20-30 which cause the social media analysis system 5 to retrieve copies of social media posts 12 stored on the remote server 7, process the retrieved posts 12 to identify posts of importance and classify the retrieved posts 12.

It will be appreciated that the functional modules 20-30 illustrated in FIG. 1 are purely notional in order to assist with the understanding of the working of the claimed invention and may not in certain embodiments directly correspond with blocks of code in the source code for the software. In other embodiments the functions performed by the illustrated functional modules 20-30 may be divided between different modules or may be performed by the re-use of the same modules for different functions.

In this embodiment the functional modules 20-30 comprise: a post retrieval module 20 for retrieving copies of social media posts 12 from a remote server 7; a lexicon generation module 22 for processing retrieved social media posts 12 to identify words and phrases appearing in retrieved social media posts 12; a network data generation module 24 arranged to utilize a lexicon generated by the lexicon generation module 22 to create network data for a set of retrieved social media posts 12; and a network analysis module 26 arranged to process generated network data to identify social media posts 12 or groups of social media posts of importance. In addition, the memory of the social media analysis system 5 is also configured to store retrieved social media posts, lexicon data and network data in a post store 28, a lexicon store 29 and network data store 30 respectively.

Figure 2:
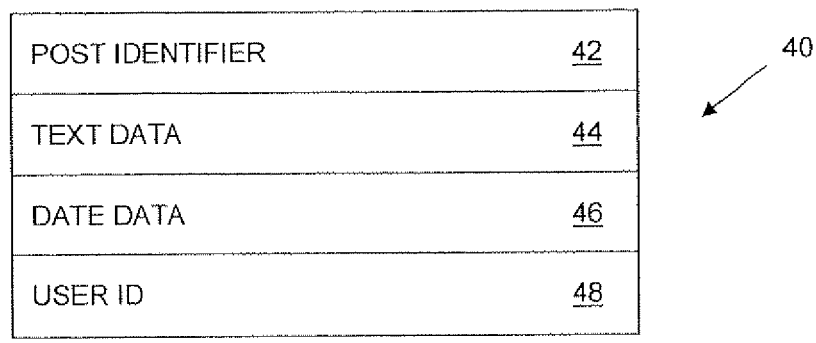
FIG. 2 is a schematic block diagram of an exemplary data structure for a social media post.

FIG. 2 is a schematic block diagram of an exemplary data structure for a social media post 40. Typically a social media post 40 will comprise a post identifier 42; text data 44; date data 46 and a user ID 48. The post identifier 42 is a unique identification number assigned to a particular post. The text data 44 is text data defining the content of the post. Typically, the text data 44 is limited in length to around 140 characters. The date data 46 comprises data indicating the timing of the post of a particular message and the user ID 48 comprises a unique identifier associating a particular post with a particular user.

Figure 3:
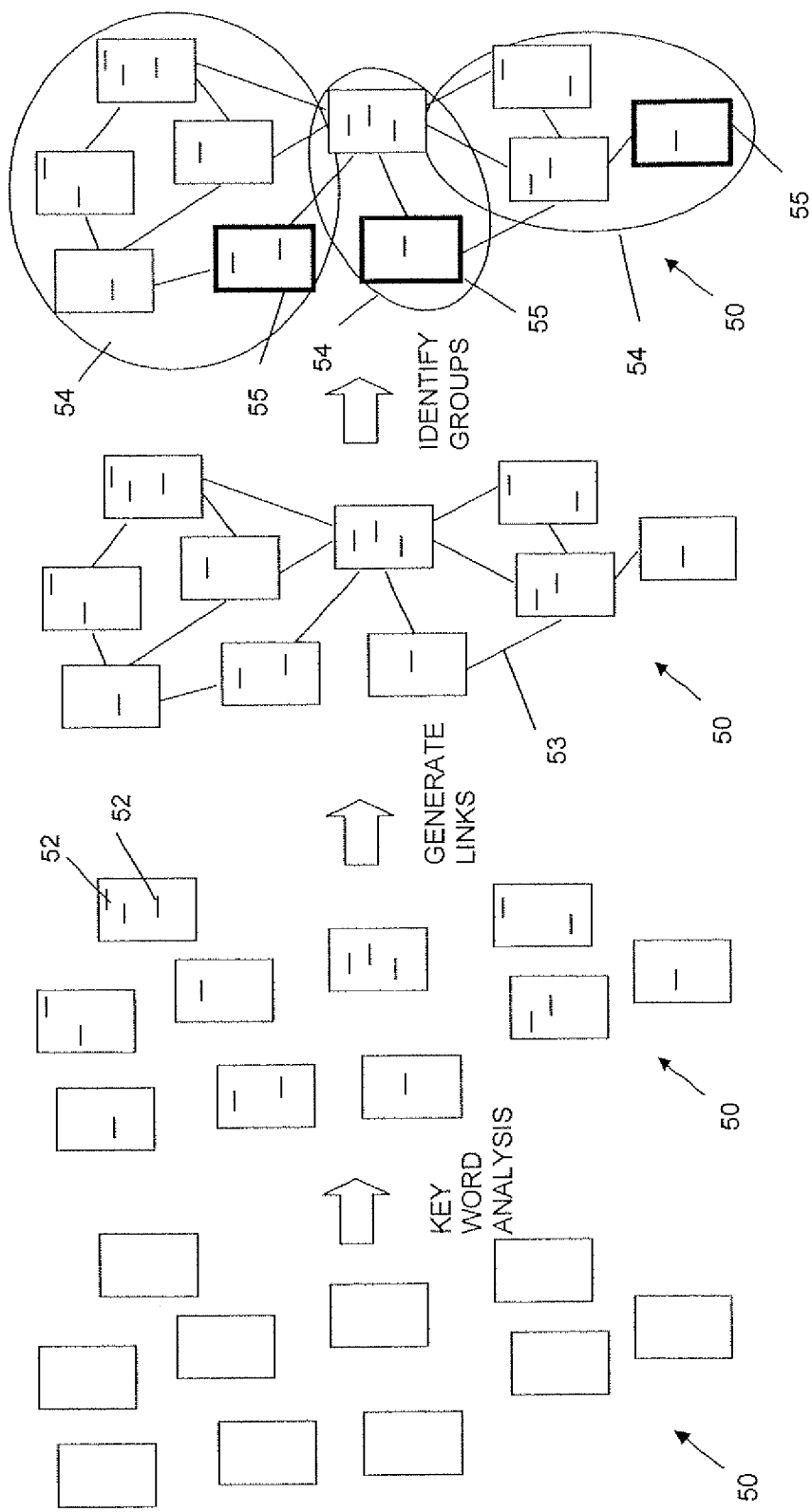
FIG. 3 is a schematic overview of post analysis in accordance with an embodiment of the present invention.

A schematic overview of the processing of a social media analysis system 5 in accordance with an embodiment of the present invention will now be outlined with reference to FIG. 3.

Initially a set of posts 50 (illustrated by a set of rectangles in FIG. 3) is analyzed to determine the words and phrases 52 which appear in the set of posts.

In some embodiments the set of keywords 52 could comprise words and phrases appearing in the lexicon which fulfill certain predefined criteria. In other embodiments the set of keywords 52 could comprise all the words and phrases appearing in a particular set of posts. Such a set of keywords 52 may be determined by parsing the text data 44 associated with each message and extracting strings of text which are separated by spaces or punctuation marks. Alternatively, in other embodiments, every possible string of characters which can be extracted from the text data 44 might be identified and utilized as a keyword.

In other embodiments, rather than seeking for the extracted data to encompass all possible strings of characters contained in the posts 50 being analyzed, the lexicon of keywords 52 may be filtered to be limited to comprise words where the frequency with which the words or phrases appear both in the posts in the set and in posts in general is less than a predetermined threshold. In such an embodiment the keywords in the lexicon 52 might further be filtered to remove words and phrases which appear in all the posts in the set 50.

The advantage of selecting a set of keywords for inclusion in the lexicon 52 based on word frequency would be that the set of words should then be indicative of the semantic content of the posts in the post set 50. The selection of words which appear in general with less than a predetermined threshold acts to filter out very common words which appear in most posts and hence provide very little indication of the semantic content of the posts in the post set 50. Limiting the keywords in the lexicon 52 to words which appear in at least two posts in the set provides a means for indentifying posts in the set 50 which relate to similar topics or concern similar ideas. Finally filtering keywords 52, to remove words or phrases which appear with high frequency or in all the posts means that the presence or otherwise of particular keywords 52 in a post is in some way indicative of how that particular post relates to the other posts in the set 50.

Once a lexicon of words and phrases 52 appearing in the set of posts 50 has been determined, network data 53 is created identifying posts which contain the same words or phrases. More specifically each of the posts is associated with a node number and link data 53 is generated which links pairs of posts which contain the same words or phrases 52.

The result of the processing to generate link data 53 will be data defining a network of nodes representing the posts and links represented by link data 53 linking the posts containing the same words and phrases together.

After network data has been created in this way, in some embodiments the generated network data 53 may then be pruned to reduce the level of connectivity of the network data 53 to a predetermined level.

The density of link connections within the network data 53 will depend upon the criteria used to determine the set of keywords 52 included in the lexicon. Where the set of keywords 52 is processed and filtered the density of link connections will be lower than if the set of keywords is not filtered. In systems where no or very little filtering of keywords 52 takes place, the network data 53 will initially be very dense as link data will be generated whenever two posts share very common elements such as very common words like "a" or "the" or even very common strings of characters such as individual letters appearing in posts. Such link data 53 provides very limited indications of the content of the posts themselves. In the case of network data generated in such a manner it is preferable to prune the network data 53 to reduce the extent of interconnectivity in the network data 53. One way of achieving this is to weight links between pairs of posts on the basis of the numbers of shared words and phrases or character strings shared by two posts and delete all links which have less than a threshold weight.

Having generated network data 53 representing how posts in the set of posts 50 are interrelated and having (if necessary) pruned the data to generate a relatively sparsely linked network data 53, the network data 53 can then be utilized to group and classify posts.

This can be achieved using a variety of network metrics based on the patterns of connectivity of the links and nodes in the network data 53. Thus for example in order to determine groupings of posts 54 the network data could be processed to identify sets of nodes corresponding to sub-networks of nodes which are more closely connected to each other than to other portions of the network. Such sub-networks should indicate groups of related posts. Representative posts from within such sub-networks could then be identified and output.

The network data 53 can then processed to determine representative posts 55 in each group. The identification of representative posts 55 can be achieved by processing the network data 53 to identify the representative posts on the basis of patterns of connectivity in the network data for the groups of related posts 54. This can be achieved in a variety of ways by determining one or more metrics measuring the extent to which nodes associated with individual posts are connected nodes corresponding to other posts in an associated group.

Having processed the network data, the content of the groups 54 can then be represented by outputting the texts for one or more selected posts 55 which are identified as being representative of the group. Such posts might be posts associated with nodes identified as being central to the group and hence posts with text which frequently appeared in other posts in the group. Alternatively a number of posts might be identified which enabled the range of comment of post in a group to be illustrated.

The above processing of a set of social media posts 12 can be combined with processing of data identifying the connections between authors of different posts. Thus for example posts included in a set of posts 50 could be filtered on the basis of the user data 48 associated with particular posts. The user data 48 used for filtering could for example be selected on the basis of the messages a particular user is following and hence the identification of representative messages could provide an indication of the range of messages a particular user was being exposed to.

Similarly analysis of the connections between particular users may indicate that only certain communities are connected to and hence viewing a particular user's posts. The content of their posts and the content of posts viewed by a desired audience could be identified and compared.

Having outlined the processing undertaken by a social media analysis system 5, the processing undertaken in accordance with an exemplary embodiment of the present invention will now be described in greater detail with reference to FIGS. 4 and 5.

Figure 4:
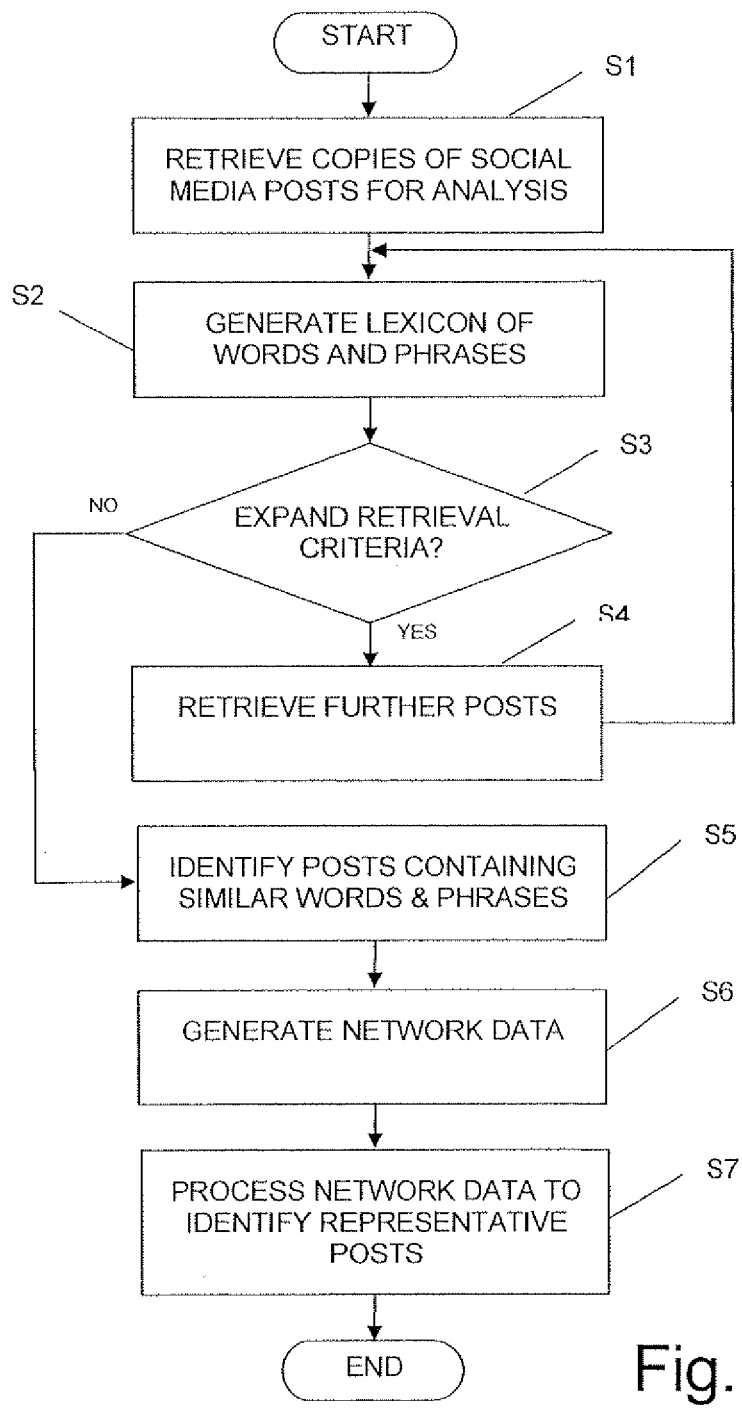
FIG. 4 is a flow diagram of the processing undertaken by the system of FIG. 1.

Turning first to FIG. 4 which is a flow diagram of the processing of a social media analysis system 5 of FIG. 1, as an initial step (s1), the post retrieval module 20 of the social media analysis system 5 is invoked and retrieves copies of the social media posts 12 from the remote server 7 where they are stored and stores copies of the retrieved social media posts 12 in the post store 28.

The data retrieved by the post retrieval module 20 may be targeted by requesting that the remote server 7 provide copies of all messages for an identified range of dates or times as indentified by the date data 46 containing particular keywords or groups of keywords. In the case of for example Twitter® messages, one way to identify a suitable set of posts 50 for initial analysis might be to request posts containing particular hash tags, that is particular phrases preceded by a "#" character used in the Twitter system to denote the context.

Having retrieved the an initial set of posts 50, the lexicon generation module 22 is invoked to generate (s2) a lexicon of words and phrases appearing in the text data 44 of retrieved social media posts 12.

In this embodiment, lexicon data is generated by processing the text data 44 to identify individual words and phrases appearing in the text. Whenever a new word or phrase is extracted, from a post, the extracted word or phrase is compared with a list of previously encountered words and phrases. If the word or phrase had not previously been encountered when processing the current set of retrieved social media posts 12, a new item of lexicon data is stored in the lexicon store 29.

In this embodiment, having processed the social media posts 12 stored in the post store 28 and generated lexicon data, the lexicon generation module 22 then enables a user to select (s3) from the generated lexicon words and phrases which might be used to supplement the initial search phrase.

Thus for example, if an initial search was based on the presence of a particular hash tag within text data 44, processing the text in this way would initially generate a set of words or phrases which were present in the text data 44 of posts including that hash tag. The extracted words and phrases could then be analyzed and those words and phrases which were particularly relevant to the topic being discussed could then be identified. Such words and phrases would be those words and phrases whose frequency in the retrieved data was significantly higher than would be expected when compared to the content of posts in general. Such a comparison would indicate that those particular words and phrases were indicative of a post relating to the same content as the original hash tag.

A supplementary retrieval of information is then (s4) undertaken by the post retrieval module 20 to retrieve copies of additional social media posts 12 from the remote server 7 associated with the particular date range which contain any additionally identified keywords. When the posts are retrieved, copies of the posts are stored in the post store 28.

Identifying an initial target set of posts (s1); lexical analysis (s2); identification of additional search terms (s3); and obtaining additional posts (s4) using the new search terms can be performed a number of times so that a set of posts 50 representative of posts on a particular topic are retrieved from the remote server 7 and stored in the post store 28 and lexicon data identifying all the words and phrases used in the selected posts 50 are stored in the lexicon store 29.

When a desired set of posts 50 has been identified and downloaded into the post store 28, the network generation module 24 is then invoked and proceeds (s5) to generate data identifying posts containing the same or similar words and phrases.

In this embodiment, this is achieved by initially causing the lexicon generation module 22 to process the text data 44 of all of the retrieved posts and identify the strings of text characters included in each of the posts.

This is achieved by the lexicon generation module 22 selecting an initial post and associating the post with a node value. The post is then processed to determine all of the individual character strings included in the text data 44 of that post. Thus for example the text data could first be analyzed to identify each unique single character string. Then the pairs of characters included in the text data could be identified. This is repeated until eventually the single character string corresponding to the entire text message was extracted.

Each of these extracted strings is then stored as an item of lexicon data in the lexicon store 29 together with a list of nodes comprising the node number of the post currently being processed.

The network data generation module 24 then increments the current node value and causes the lexicon generation module 22 to select then next post for processing.

Again as with the first post, the individual text strings contained in the post are extracted. Where an extracted string corresponds to a string previously extracted from a previously processed post, the current node value is added to the list of nodes associated with that string of characters. If an extracted string of characters has not previously been identified and therefore does not correspond to a previously extracted string, the newly identified string is associated with a list of nodes containing a single entry identifying the current node number.

This processing is repeated for all the retrieved posts in the set 50. When the all of the posts 50 have been processed, each of the unique strings of characters appearing in any of the posts will be stored as lexicon data within the lexicon store 29 and each string will be associated with a list of one or more items of data identifying the node values of associated posts which contain that string. Thus for example if a particular phrase appears only in a single post then the list associated with that phrase will contain a single entry identifying that post. Conversely commonly used words or phrases will be associated with lists containing data identifying multiple entries, where each entry identifies the node value associated with a post containing that phrase.

Having generated the lists of posts associated with each of the extracted words or phrases, this data is then (s6) converted by the network data generation module 24 into network data and stored in the network data store 30.

More specifically in this embodiment, as described above when all of the posts in the set 50 have been processed, each item of lexicon data in the lexicon store 29 will be associated with a list identifying the node numbers of the posts in the post store 28 which contain the text, word or phrase identified by that item of lexicon data. Each of the lists which contains two or more entries can then be processed to determine how many times the same node numbers appear in the same lists. This value indicates the extent to which the text data 44 included in a pair of posts corresponding to the node numbers contains the same words, letters and phrases. Network data identifying pairs of nodes corresponding to posts containing shared text data 44 can then be generated, where each of the items of network data is associated with the value identifying the extent to which the pair of posts contain the same words, phrases and sequences of letters.

The network data generated as described above, will typically be very dense as an item of network data will be generated whenever two posts in the set 50 have at least one letter of text in common. More sparsely connected network data can be generated by eliminating from the network data, those items of data associated with values less than a selected threshold, indicating that a pair of posts contains only a limited number of similar character sequences. The threshold which creates network data of a desired density will depend upon the content of the retrieved posts 12 being processed.

After network data for a set of retrieved social media posts has been generated, the social media analysis system then (s7) invokes the network analysis module 26 which processes the network data to indentify relationships between the social media posts 50 thereby by indentifying related groups of social media posts and/or social media posts of importance.

Figure 5:
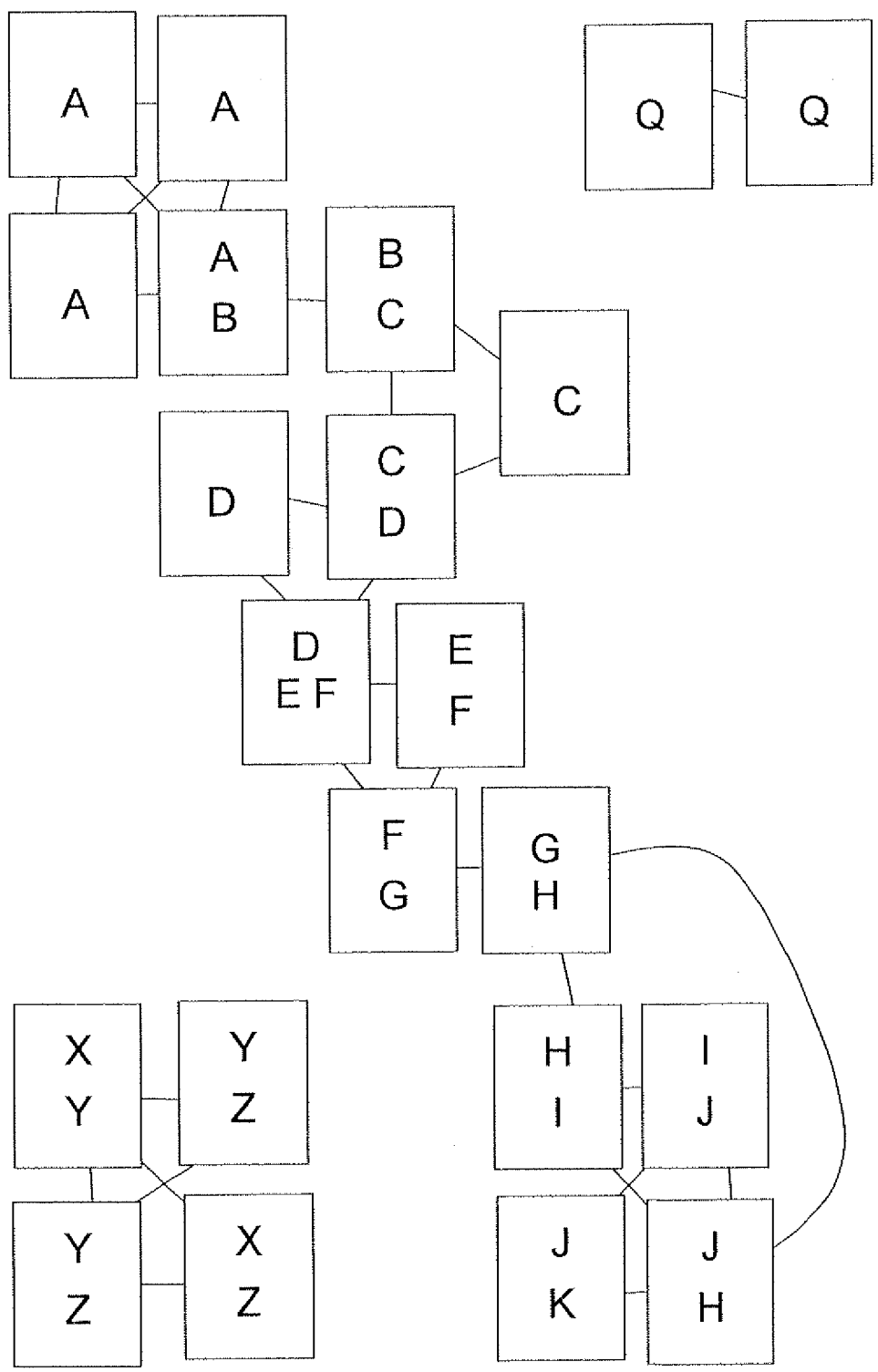
FIG. 5 is a schematic illustration of a set of posts interconnected by link data to illustrate the processing undertaken in accordance with the present invention.

FIG. 5 is an exemplary schematic illustration of network data for a set of posts. In FIG. 5 each of the posts is represented by a rectangle where the keywords or phrases in the posts are represented by letters and a line between two rectangles illustrates the existence of link data linking two posts because two posts include a threshold amount of the same words, characters or phrases.

Looking at FIG. 5 a number of relationships between the content of the illustrated posts becomes apparent. In the example of FIG. 5 it is apparent that the link data acts to sort the posts into three groups: a main group; a pair of posts containing the keyword or related words represented by the letter Q; and a set of four posts associated with the keywords or related words X, Y and Z. From the illustrated network data it is apparent that these groups of posts have less than a threshold amount of words, characters or phrases in common and hence it is likely that the groups of posts relate to different subjects.

Further considering the main group in detail, it will be apparent that whereas all the posts in the main group share keywords or related words or phrases with at least one other post in the main group, the main group can itself be divided into a number of sub-groups sharing keywords or related words. It will also be appreciated that removal of certain posts from the main group would cause the main group to divide into separate groups.

Each of the above features of the network illustrated in FIG. 5 can be identified visually and can also be extracted from the network data through appropriate processing of the link data. Further it will also be appreciated that the relationships between posts described will be based on semantic meaning of content of the posts.

Further it will be appreciated that different network metrics correspond to different semantic relationships. Thus for example in the case of the posts illustrated in FIG. 5 it is apparent that the keywords or phrases D, E and F correspond to posts which are in the centre of the main group of posts. In the illustrated example, this would serve to indicate that the content of these posts are more representative of the main group than say for example the content of the posts at the periphery of the main group such as the posts containing the keyword A.

In the present embodiment, once network data has been generated, the network analysis module 26 proceeds to process the network data to determine a number of network metrics.

The generated metrics could be determined in a number of different ways.

Thus for example a simple network metric that could be determined would be to identify the number of links that are associated with a particular post. This would provide an indication of the number of other posts which include keywords which are shared with that particular post. Where this value was relatively high, that would indicate that the post in question was relatively representative of the group of posts a whole.

An alternative approach would be to rank the posts utilizing a ranking scheme such as the conventional PageRank™ algorithm such as is described in U.S. Pat. No. 6,285,999. In such a system after assigning all posts an initial ranking value, a post rank value is calculated in an iterative manner by updating the initial value for a post based on the sum of the ranking values for posts linked to that post as represented by the stored link data divided by the number of links in those posts.

More specifically the rank assigned to a post A linked to posts B, C, D etc is calculated as:

$$PR(A) = \frac{1-d}{N} + d\left(\frac{PR(B)}{L(B)} + \frac{PR(C)}{L(C)} + \frac{PR(D)}{L(D)} + \ldots\right).$$

where PR(u) is the value assigned to post u, L(u) is the number of links to post u, N is the total number of posts for which the values are being calculated and d is a damping factor. The result of such a calculation after a number of iterations approximates the probability of an individual arriving at a particular post when randomly following links and hence the higher values are assigned to better linked posts and hence higher values will be associated with more representative posts.

Alternatively rather than deriving a ranking value directly from the ranking values of posts and the link data associated with the posts, a two step process such as the Hyperlink-Induced Topic Search (HITS) algorithm could be used.

In such a system, initially all nodes are assigned a hub and an authority score of 1. These scores are then iteratively updated with each node's authority score being set to be equal to the sum of the Hub Scores for all nodes containing links which point to that node. Nodes hub scores are then updated to be equal to the sum of the authority scores of each node connected by individual links pointing to that node. The updated hub and authority scores are then normalized by dividing each hub score by the sum of the squares of all the hub scores and by dividing each authority score by the sum of the squares of all the authority scores. The final hub and authority scores are then those achieved after performing a set number of iterations. Again with such a system better connected and hence more representative posts will become associated with higher ranking values.

An alternative metric for determining the extent to which a post is representative of a group of posts is to utilize the link data to determine a distance measure based on the number of links in the shortest paths connecting a post to other posts in the set.

More specifically, an indication of how well connected and hence how representative a post is to the rest of a set of posts can be determined by considering the average or the maximum shortest distance to or from all posts which are connected to a particular post based on the generated link data. In this context distance means the smallest number of links that have to be traversed to link between two posts.

Where a post is poorly connected to the other posts in the set this may result in particularly high values because of the limited connection of the post to the rest of the post set or particularly low values because only a small subset of the posts are connected to the post of interest by any means. Thus either very high or very low values may indicate that a particular post is unlikely to be of representative of the set of posts as a whole.

It will be appreciated that when calculating a maximum shortest distance based on network data, it is necessary to calculate shortest distance values for all nodes in a network. However, a reasonable approximation of an average shortest distance value can be obtained just by determining values for a sample of nodes. The appropriate size of the sample will depend upon the level of connectivity of the network in question.

A further potential metric for measuring the relevance and likely importance of a post is to determine the extent that a post is within a tightly connected portion of the post set.

A simple approach to obtaining a centrality measurement is to determine the extent to which posts linked to a particular post of interest are themselves interconnected. This can be achieved by identifying the links associated with a particular node to identify a set of nodes of interest. The extent that links exist between the nodes in the set can then be calculated. If the number of interconnected nodes is high relative to the total number of possible interconnections, this then indicates that the original node is in a portion of the post set which is highly interconnected which suggests that the web post associated with a node is at the centre of a group of nodes concerned with the same subject matter.

More sophisticated algorithms can provide measures of the centrality of a post within a post set which reflect the extent to which all posts in a neighborhood are themselves well connected to the post set.

Thus for example initially all the posts in the post set could be ordered by the number of links associated with that post. All posts associated with only one link could be assigned a value of 1 indicating that such posts are at the periphery of the network.

Posts associated with two links would then be examined and assigned a value of 1 if either of the posts linked to it has already been associated with a value 1 or, otherwise, a value 2.

The remaining posts would then be processed in turn based on the ordered list, ordered by the number of links associated with the posts. For each post, the post could be assigned a ranking value N being the highest number for the number of links to posts assigned already assigned a value of N or for which no value had yet been assigned.

Thus for example when processing posts having 3 links, those posts linking to posts previously assigned a value of 1 would themselves be assigned a value of 1, those posts linking only to posts previously assigned a value 2 would themselves be assigned a value of 2 whereas posts with 3 links to or from only posts assigned the value of 3 or not yet assigned a value would be given a ranking value of 3.

In this way posts would be assigned a ranking value indicative of the extent that a post was well connected to posts which themselves are well connected. Poorly connected and poorly referenced posts are most likely to be less representative of the post set as a whole. In contrast, posts well connected to other posts which are themselves well referenced social media posts are likely to be more representative of the post set as a whole.

An alternative approach to identifying well connected and well referenced posts would be to start by associating all posts associated with three or more links to 1. The values associated with posts could then be updated by iteratively incrementing the value associated with a post by one at each iteration where the post was linked only to other posts associated with a value equal to or higher than the current iteration number and repeating this process until the values of no posts where being increased in the course of an iteration. Assigning a value to posts in such a way results in a similar ranking of posts to that using the previously described approach with poorly connected and poorly referenced posts being assigned a low value and well referenced posts referenced by similarly well connected posts being associated with a high value.

In addition or as an alternative to determining metrics indicative of the extent to which individual posts in a post set provide a link between otherwise poorly connected portions of the post set could be calculated. A number of different approaches for identifying linking nodes or groups of nodes are disclosed in U.S. Pat. No. 7,466,663 "Method and apparatus for identifying components of a network having high importance for network integrity" which is hereby incorporated by reference.

Thus, for example, U.S. Pat. No. 7,466,663 discloses algorithms for determining the proportions of paths between nodes which pass through a particular node. This is achieved by generating a list of nodes connected by links to a particular node and then determining all the paths of up to a certain length linking pairs of nodes in the list. The proportion of paths including a reference to the node of interest can then be determined. When applied to a set of posts and generated link data in accordance with the present application identifying such nodes results in identifying posts which include words or phrases which link otherwise disparate portions of the post set.

U.S. Pat. No. 7,466,663 also discloses algorithms determining the nodes which provide bridges between otherwise unconnected portions of a network. This is achieved by associating nodes with co-ordinate data and then modifying the co-ordinate data so that nodes connected by links are associated with co-ordinates which are closer together and nodes which are not connected to each other are further apart. The length measures of the distances between linked nodes then provides a measure of the extent links provide bridges to otherwise unconnected portions of the network. Applying such an algorithm to network data generated in accordance with the present application would enable words or phrases shared between otherwise apparently unrelated portions of a post set to be identified.

In addition to describing algorithms for identifying individual nodes providing bridges between otherwise unconnected or poorly connected portions of a network U.S. Pat. No. 7,466,663 also describes algorithms for identifying groups of nodes providing connections between otherwise unconnected or poorly connected portions of a network. This is achieved by assigning nodes into a number of groups and then swapping nodes between groups so that nodes sharing connections are assigned to the same group. Processing network data in this way acts to divide the nodes into a number of groups of nodes sharing connections. Nodes linked to nodes in different groups can be identified as providing bridges between otherwise poorly connected or unconnected portions of a network.

The application of such an algorithm to network data generated in accordance with the present invention would enable posts in a set of posts to be divided into a number of groups where the groups of posts contain related words or phrases. This would enable groups of posts containing words or phrases which provide a link between groups of posts which otherwise do not have words or phrases in common to be identified.

Having processed the link data for associated posts with metric values based on the patterns of connectivity indicated by the link data, the metric values are then utilized to identify posts or groups of posts within the post set and identify representative posts for each group.

Thus, for example, based on the calculated metrics, posts which can be identified as being centrally and well connected in a group of posts can be selected as being representative of those groups. Alternatively, in some embodiments, a range of posts might be identified and selected to represent the groups. When selecting a range of posts, the selection might be such to identify a range of more and less centrally located nodes in the generated network data 53 and output the posts 55 associated with those nodes.

In addition to utilizing the generated network data to classify posts and identify representative posts, the social media analysis system 5 in some embodiments could be arranged to utilize the following data 14 associating users with lists of other users whose posts they would like to receive and followers' data 16 identifying the users who have indicated they would like to receive that user's posts to filter the set of posts to be processed.

Thus for example in some embodiments the following data 14 might be used to identify a set of posts which a user will have received and the analysis of posts could be limited to that set. In this way a representative sample of the influences a particular user receives could be identified and presented.

The following 14 and followers' 16 data can also be utilized to identify users of interest whose, posts or received posts might be of interest. More specifically, in some embodiments the following 14 and followers' 16 data could be utilized to generate network data identifying the manner in which users interact. Such user network data can be generated by associating each user with an individual node number and generating link data between an individual as represented by that node number and other individuals as identified by the following 14 and followers' 16 data associated with that individual. The generated user network data could then be processed to generate network metrics to identify users and groups of users of interest.

Thus, for example, based on the user network data, key users, associated with network metrics identifying them as being particularly influential, might be identified. Such metrics could include simple counts based on the numbers of followers associated with a user or they could be determined on the basis of more complex metrics such as have been described above.

When individual users have been identified as being of importance, this can then be used to filter the set of posts for which representative text data is determined. Thus in this way the content of those posts which key individuals post or alternatively the posts which key individuals follow, and hence are potentially influenced by, can be identified.

Combining the analysis of the social network data as indicated by following 14 and/or followers' 16 data with data identifying representative text data from posts for particular selected individuals then enables a representative set of posts which might be received or influence an individual to be determined. Similarly utilizing the following 14 and/or followers' data 16, representative posts, which are likely to spread and therefore influence others, can be identified.

In some embodiments rather than using network metrics to identify groups of users or groups of posts, other approaches might be used.

Thus for example in some embodiments each post could be randomly assigned to one of a number of different sets. Values could then be calculated to identify for each of the sets the extent to which members of the set were connected to other members of the set and the extent to which members of the set were connected to other members of other sets. The membership of sets could then be randomly modified to see if these values indicated that the modification was such as to cause the sets to be more indicative of more connected groups of posts. By iteratively modifying the set membership in such a way, the groups could be such as to represent groups of posts utilizing similar words and phrases.

A similar approach could be utilized to process network data identifying a network of individuals and divide the network into a number of groups of individuals.

Having identified such groupings one or more representative posts for each group could be identified. Thus for example calculated metrics could be utilized to identify the most central and hence best connected post in a group which should therefore be most representative of the group and select that post to represent the content of the group. In other embodiments other postings might be selected as alternatives or in addition to such identified central posts.

Further Embodiments and Modifications

In the above described embodiment link data is described as being generated on the basis of pairs of posts containing shared character strings. It will be appreciated that in other embodiments various criteria could be used to generate link data. Thus for example rather than generating an item of link data whenever a two posts share a character string, link data could be generated only where two posts share at least a predetermined number of keywords. Alternatively an item of link data could be generated for each keyword shared by two posts. This would lead to the generation of network data where posts were linked by multiple items of link data where the number of items of link data represents the number of shared keywords. Network metrics could then be generated on the basis of such network data.

In some embodiments, a social media analysis system might be arranged only to extract strings corresponding to individual words or phrases. Such a system might for example identify words and phrases by only extracting character strings separated by spaces or punctuation marks. In such embodiments lexical analysis might be undertaken to cause link data to be generated to link posts containing the same words as well as words which are semantically similar. This could be achieved by for example identifying synonyms appearing in posts and replacing the synonyms with a common word to identify a particular subject. Similarly in order to identify similarities between posts in some embodiments, the truncation of words might be utilized to identify semantically similar words.

More specifically, identification of words sharing common word sterns can be achieved through a combination of rules reflecting the declensions in the language of the post being processed e.g. applying rules in English that suffixes such as 'er', 'ed', 'ing', and 'ly' should be removed to identify a root word. Special rules can be stored to identify declensions of irregular words e.g. 'run' and 'ran'

If another item of lexicon data which shares the same word stem were to be identified, the two items of lexicon data would then be merged.

By way of illustration, if items of lexicon data corresponding to the words: "fishing", "fished", "fish" and "fisher", which all share the same root word "fish", were to be encountered, the four original items of lexicon data for "fishing", "fished", "fish" and "fisher" would be replaced by a single item of lexicon data for the word stem "fish" where the replacement item of lexicon data was associated with a list of references to posts which contain any of the replaced lexicon words: "fishing", "fished", "fish" and "fisher".

By processing the lexicon data this way the lexicon data is updated so that a single item of lexicon data is stored which accounts for inflections and declensions of words appearing in the post.

Having processed the lexicon data to merge lexicon entries corresponding to words sharing the same word stems, the lexicon generation module 22 could then proceed to process the lexicon data to merge items of lexicon data corresponding to synonyms. That is to say the items of lexicon data are each considered in turn and compared with the other items of stored lexicon data to identify items of lexicon data related to different words or phrases with identical or very similar meaning e.g. 'buy' and 'purchase' or 'sick' and 'ill' etc. Whenever any such synonyms are identified, the items of lexicon data for the two synonyms are replaced by a single item of lexicon data associated with both words and a list of references to the posts which contain either of the two synonyms.

One way this might be achieved is through storing data corresponding to a thesaurus to enable synonymous words to be identified Alternatively, instead of processing lexicon data to identify synonyms and words sharing common word stems, other types of processing might be undertaken. Thus for example in some embodiments determination of other types of semantic similarity might be used to identify related words.

In the above embodiment a system has been described in which dense network data is generated and then pruned to generate network data of a desired density. It will be appreciated that in some embodiments rather than pruning network data, network data might be generated incrementally until a threshold amount of network data has been generated. So for example in an embodiment where words and phrases present in a set of social media posts were to be identified, network data might initially be generated based on the words and phrase which appear least frequently in a set of posts and continued based on words of increasing frequency until data of the desired density was created. The advantage of such an approach would be that the rarer words are more likely to be indicative of semantic content and hence the posts including the same rare words are likely to relate to similar subjects.

In other embodiments rather than generating network data of a particular density, other criteria might be utilized to limit the generation of network data. For example, network data might be generated only for identified keywords which fulfill certain criteria.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier can be any entity or device capable of carrying the program.

For example, the carrier may comprise a storage medium 18, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means. When a program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

What is claimed is:

1. A method of analyzing social media posts, the method comprising:
   processing a set of social media posts to identify strings of characters present in the posts;
   generating network data by:
      associating posts with node numbers; and
      generating link data identifying links between nodes associated with posts containing similar sets of strings of characters;
   processing the generated network data to determine one or more metric values for each of the nodes wherein the metric values are determined based on the patterns of connectivity defined by the link data of the generated network data;
   utilizing the determined metric values for nodes to select one or more posts as posts representative of the set of media posts; and
   outputting data identifying the selected representative posts.

2. The method of claim 1, further comprising:
   processing the generated network data to identify groups of nodes interconnected by links wherein utilizing the determined metric values for nodes to select one or more posts as posts representative of the set of media posts comprises utilizing the determined metric values for nodes to select one or more posts as posts representative of the identified groups of nodes.

3. The method of claim 1, wherein processing a set of social media posts to identify strings of characters present in the posts comprises identifying all strings of characters contained within a post and generating link data identifying links between nodes associated with posts containing similar sets of strings of characters comprises generating link data identifying links between nodes wherein the posts associated with nodes connected by links contain at least a threshold number of the same character strings.

4. The method of claim 1, wherein processing a set of social media posts to identify strings of characters present in the posts comprises: identifying all strings of characters contained within a post which correspond to words; and
generating link data identifying links between nodes associated with posts containing similar sets of strings of characters comprises:
identifying words contained in a set of posts which appear with a certain frequency; and
generating link data identifying links between nodes wherein the posts associated with nodes connected by links contain at least a threshold number of the same words which appear in the set of posts with said frequency.

5. The method of claim 1, wherein
processing a set of social media posts to identify strings of characters present in the posts comprises:
identifying all strings of characters contained within a post which correspond to words; and
generating link data identifying links between nodes associated with posts containing similar sets of strings of characters comprises:
identifying words or phrases appearing in the set of posts which are synonymous or which share common word stems; and
generating network data identifying links between nodes wherein the posts associated with nodes connected by links contain words or phrases which are synonymous or share the word stems.

6. The method of claim 1, wherein processing the generated network data to determine one or more metric values comprises:
processing link data to generate metric values indicative of the extent to which a node associated with a post provides a link between otherwise unconnected or poorly connected portions of the network defined by network data.

7. The method of claim 1, wherein processing the generated network data to determine one or more metric values comprises:
processing link data to generate metric values indicative of the extent to which the proportion of paths between nodes in the network pass via a particular node associated with a post.

8. The method of claim 1, wherein processing the generated network data to determine one or more metric values comprises:
processing link data to generate metric values indicative of the minimum path length between a node associated with a post and other nodes associated with posts in the post set.

9. The method of claim 1, wherein processing the generated network data to determine one or more metric values comprises:
processing link data to generate metric values indicative of the extent to which a node associated with a post is within a well connected portion of the network defined by network data.

10. The method of claim 9, wherein processing the generated network data to determine one or more metric values comprises:
associating posts linked to at least a threshold number of other posts with a value; and
iteratively incrementing the values associated with posts linked only with posts associated with values in excess of the current iteration number until no values are updated during an iteration.
associating each of the posts with a value wherein the value is:

11. The method of claim 1, wherein processing the generated network data to determine one or more metric values comprises:
indicative of the number of other posts linked to that post, if none of the links associated with the post link to posts which have previously been processed and associated with a value; or
indicative of the greatest number associated with a post previously processed and associated with a value which is linked to the current post by a link where the current post is linked to at least that number of posts associated with such a value or which have not yet been processed and associated with a value.

12. The method of claim 1, wherein processing the generated network data to determine one or more metric values comprises:
randomly assigning each of the posts to one of a number of groups;
iteratively modifying the assignment of the posts to groups and determining whether the modification of the assignment of posts to groups causes posts be linked by link data to posts in different groups to a greater extent than posts are linked to posts in different groups in the unmodified assignment; and if so reversing the modification; and
when a final assignment has been determined, identifying the extent to which a post is representative of a group of posts on the basis of the number of links to other posts in other groups in the final assignment.

13. The method of claim 1 further comprising:
obtaining data identifying the identify of senders and recipients of social media posts being processed;
generating network data on the basis of said obtained data wherein the network data comprises nodes and links wherein nodes are associated with senders and recipients of social media posts and links connect senders and recipients of social media posts;
processing the generated network data to determine one or more metric values for each of the nodes wherein the metric values are determined based on the patterns of connectivity defined by the link data of the generated network data;
utilizing the determined metric values for nodes to select one or more senders associated with the nodes; and
processing the social media posts sent or received by selected users to identify representative posts sent or received by said selected users.

14. The method of claim 13 wherein utilizing the determined metric values for nodes to select one or more users comprises utilizing the determined metric values for nodes to divide the senders and recipients of social media posts into a plurality of groups; and
processing the social media posts sent by selected users to identify representative posts sent or received by said selected users comprises processing the social media posts sent or received by selected users to identify representative posts sent or received by said groups.

15. A non-transitory computer readable medium storing computer interpretable instructions which when interpreted by a programmable computer cause the computer to:
process a set of social media posts to identify strings of characters present in the posts;
associate posts with node numbers; and
generate link data identifying links between nodes associated with posts
containing similar sets of strings of characters;

processing the generated link data to determine one or more metric values for each of the nodes wherein the metric values are determined based on the patterns of connectivity defined by the link data of the generated network data;

utilize the determined metric values for nodes to select one or more posts as posts representative of the set of media posts; and output data identifying the selected representative posts.

16. An information processing apparatus comprising:

a processor and memory;

a number of modules that store computer readable instructions in the memory that are executable by the processor, comprising:

a lexicon generation module with stored instructions executable to identify strings of characters present in a set of social media posts;

a network data generation module with stored instructions executable to generate network data in which posts are associated with nodes and link data link nodes corresponding to posts which contain similar sets of strings of characters; and a network analysis module with stored instructions executable to process network data generated by the network data generation module to determine one or more metric values for each of the nodes wherein the metric values are determined based on the patterns of connectivity defined by the link data of the generated network data;

utilize the determined metric values for nodes to select one or more posts as posts representative of the set of media posts; and output data identifying the selected representative posts.

* * * * *